United States Patent [19]

Chrobak et al.

[11] Patent Number: 4,936,365
[45] Date of Patent: Jun. 26, 1990

[54] ANISOTROPIC TIRE

[75] Inventors: Dennis S. Chrobak, Silver Lake Village, Ohio; Peter P. Roch, Colmar-Berg, Luxembourg

[73] Assignee: The Goodyear Tire & Rubber Company, Akron, Ohio

[21] Appl. No.: 283,411

[22] Filed: Dec. 12, 1988

[51] Int. Cl.$^5$ .............................................. B60C 5/01
[52] U.S. Cl. ..................................... 152/452; 152/523
[58] Field of Search ....................... 152/452, 517, 523; 156/125

[56] References Cited

U.S. PATENT DOCUMENTS

| | | | |
|---|---|---|---|
| 1,827,668 | 10/1931 | Musselman | 152/452 |
| 3,192,984 | 7/1965 | Bourdon | 152/354 |
| 3,842,883 | 10/1974 | Masson et al. | 152/354 |
| 3,911,987 | 10/1975 | Takusagawa et al. | 152/354 |
| 3,948,304 | 4/1976 | Mirtain | 152/354 |
| 3,954,131 | 5/1976 | Hoshino et al. | 152/354 |
| 4,006,767 | 2/1977 | Ford | 152/357 |
| 4,029,730 | 6/1977 | Schroeder | 264/315 |
| 4,090,547 | 5/1978 | Schmidt | 152/354 |
| 4,121,642 | 10/1978 | Schwartz | 152/452 |
| 4,152,186 | 5/1979 | Shibata | 156/123 |
| 4,155,393 | 5/1979 | Grawey | 152/353 |
| 4,201,261 | 5/1980 | Bartley et al. | 152/452 X |
| 4,253,513 | 3/1981 | Larson et al. | 152/354 |
| 4,305,446 | 12/1981 | Brown, Jr. et al. | 152/354 |
| 4,315,536 | 2/1982 | Knipp et al. | 152/330 |
| 4,341,249 | 7/1982 | Welter | 152/523 |
| 4,405,007 | 9/1983 | Welter | 152/353 |
| 4,669,517 | 6/1987 | Krishnan | 152/209 |
| 4,711,284 | 12/1987 | Schmidt | 152/452 |

FOREIGN PATENT DOCUMENTS 1442147  7/1976  United Kingdom ............... 152/452

Primary Examiner—Michael W. Ball
Assistant Examiner—Geoffrey L. Knable
Attorney, Agent, or Firm—R. J. Slattery, III

[57] ABSTRACT

A tire (10) is provided with a cast body (12). The cast body has an annular circumferentially extending isotropic portion (14) having a pair of anisotropic side portions (16,18) extending therefrom. The side portions are rendered anisotropic by geometric means. A reinforcing means (30) is attached to the inner or interior surface of the side portions and extends from the isotropic portion to a point radially inwardly of the maximum section width (SW) of the tire. The reinforcing means may include a number of alternating ridges and grooves (46,48). The body may be cast from an elastomeric material such as polyurethane. A tread (26) and belt package (28) is disposed over the body and may be either elastomeric or rubber.

22 Claims, 4 Drawing Sheets

ANISOTROPIC TIRE

BACKGROUND OF THE INVENTION

This invention relates generally to tires and a method of manufacturing them. More particularly this invention relates to a tire which does not have a cord reinforced carcass.

Cord reinforced tires of rubber or other rubberlike materials having the reinforced plies extending from bead-to-bead require a number of manufacturing components and steps and are thereby fairly costly and/or time consuming to produce. In an effort to reduce the manufacturing costs and/or time involved there has been an effort to produce cast tires.

Some cast tires have been made with the same cross-sectional shape as the cord reinforced tires. Some have been disclosed as being with and without reinforcing tread belt plies and with and without rubber treads, while having a cast body. Some have advocated decoupling from the sidewall from the tread, such as disclosed in U.S. Pat. No. 4,006,767, Pneumatic Tires, while others advocate providing a rib in the shoulder region of a tire as shown in U.S. Pat. No. 4,305,446.

It is known that when cast tires are made with the same general cross-section as the cord reinforced tires the walls of the tires must be made with a substantial thickness to provide the necessary strength and support. The increased wall thickness is undesirable because it increases the weight and cost of the tires as well as causing higher operating temperatures.

Furthermore, cast tires have experienced problems in durability and sidewall growth.

Unreinforced cast bodies are isotropic, that is they have equivalent properties in the x, y and z directions, because they are homogeneous. Isotropic materials when subjected to stress along one axis transfer a significant portion of that stress along the other axes. In contrast, a radial tire, by virtue of the reinforcing carcass cords is not isotropic. Loads carried by these cords transmit a smaller portion of these stresses to the rubber and the other axes.

Furthermore, when an isotropic cast carcass is subjected to radial loading there is a tendency to resist this and thereby prevent the tire from attaining a deflected contour similar to that attained by radial tires. In other words, the tire resists bulging of the sidewall which increases lateral squirm.

SUMMARY OF THE INVENTION

It, therefore, is an object of this invention to provide a tire that has a reduced number of components and/or time required to produce as opposed to a conventional radial tire, such as without carcass-reinforcing plies.

It is also an object of the invention to provide a tire having a cross-sectional shape for improved distribution of stresses in the tire during operation.

It is also an object of this invention to provide a cast tire that has characteristics which are similar to a radial ply tire.

It is another object of the invention to provide a cast body as an intermediate article of manufacture for use in the final assembly of a tire.

It is a further object to provide a cast anisotropic body for use in tires.

It is a feature of this invention to provide a cast body for use in manufacturing tires having anisotropic side portions.

It is another feature of this invention to provide a cast body which has been rendered anisotropic by geometric means.

Still another feature of this invention is to provide a tire which has a reinforcing means located on the inner sidewall portion.

It is a further feature of this invention to provide a tire having a cast body having alternating ridges and grooves therein.

An advantage of these cast tires is that they reduce the sidewall growth and increase the tire's durability.

It is another advantage that the compressive stresses applied to the belt edges of a cast tire by lateral squirm are reduced.

It is another advantage that the tires have runflat characteristics.

These and other objects, features and advantages can be accomplished by a tire comprising an elastomeric body having a circumferentially extending annular isotropic portion, a pair of anisotropic side portions, each extending radially inwardly from an axial edge of the annular isotropic portion to an isotropic bead portion, an inextensible bead ring disposed within each bead portion, a surface engaging tread portion disposed radially outwardly of the body and a belt structure disposed between the body and the tread portion.

The above may also be further accomplished by a tire having a cordless elastomeric body, a surface engaging tread portion disposed radially outwardly of the body, and a belt structure disposed between the body and the tread portion. The body has a circumferentially extending portion and a pair of sidewalls, each sidewall extending from the circumferentially extending portion to a bead portion having an inextensible bead ring therein and a reinforcing means along an inner surface. The reinforcing means extends circumferentially along the inner surface of each sidewall and from a point radially inwardly from the maximum section width of the tire to an axial edge of the circumferentially extending portion. The axial edge being spaced a predetermined distance from the equatorial plane of the tire and equal to or axially inwardly thereof the axially outermost edge of the belt structure.

The above may be also accomplished by a method of manufacturing a tire comprising the steps of providing a precured package comprising a surface engaging tread portion disposed over a belt structure; providing an annular rigid tire mold having a mold cavity with an inner molding surface; providing an annular rigid core inside the mold having an outer molding surface spaced from the inner molding surface providing the outer molding surface with a general positive radius of curvature for forming the inner surface of the tire; and providing a plurality of alternating ridges and grooves on the outer surface of the core for forming areas of alternating thickness in each side portion of the tire. The ridges and grooves extend from a point radially inwardly from the maximum section width of the tire to a point spaced a predetermined distance from the equatorial plane of the tire. The precured package is placed into the tire mold such that the inner molding surface abuts an outer surface of the surface engaging tread portion. The tire is cast by filling the space between the outer and inner molding surfaces and the precured package with an elastomeric precursor and setting the precursor to form.

BRIEF DESCRIPTION OF THE DRAWING

The following is a brief description of the drawings in which like parts may bear like reference numerals and in which.

DESCRIPTION OF THE INVENTION

The following definitions are applicable to this specification, including the claims wherein:

"Axial" and "axially" are used herein to refer to directions and/or displacements that are parallel to the axis of rotation of a tire.

"Radial" and "radially" mean directions and/or displacements from the axis of rotation of the tire.

"Inner" means directions and/or displacements toward the inside of the tire while "outer" means directions and/or displacements toward the exterior of the tire.

"Equatorial plane (EP)" means the plane perpendicular to the tire's axis of rotation and passing through the center of its tread.

"Belt structure" means at least two layers or plies of parallel cords, woven or unwoven, underlying the tread, unanchored to the bead, and having both left and right cord angles in the range from 17 degrees to 27 degrees with respect to the equatorial plane of the tire.

"Tread width" means the arc length of the tread surface in the axial direction, that is, in a plane passing through the axis of rotation of the tire.

"Section width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Section height" means the radial distance from the nominal rim diameter to the maximum outer diameter of the tire at the road-contact surface nearest its equatorial plane.

"Aspect ratio" of the tire means the ratio of its section height to its section width.

"Isotropic" means exhibiting properties with the same values when measured along all directions.

"Anisotropic" means exhibiting properties with different values when measured along the axis in a different direction.

Figure 1:
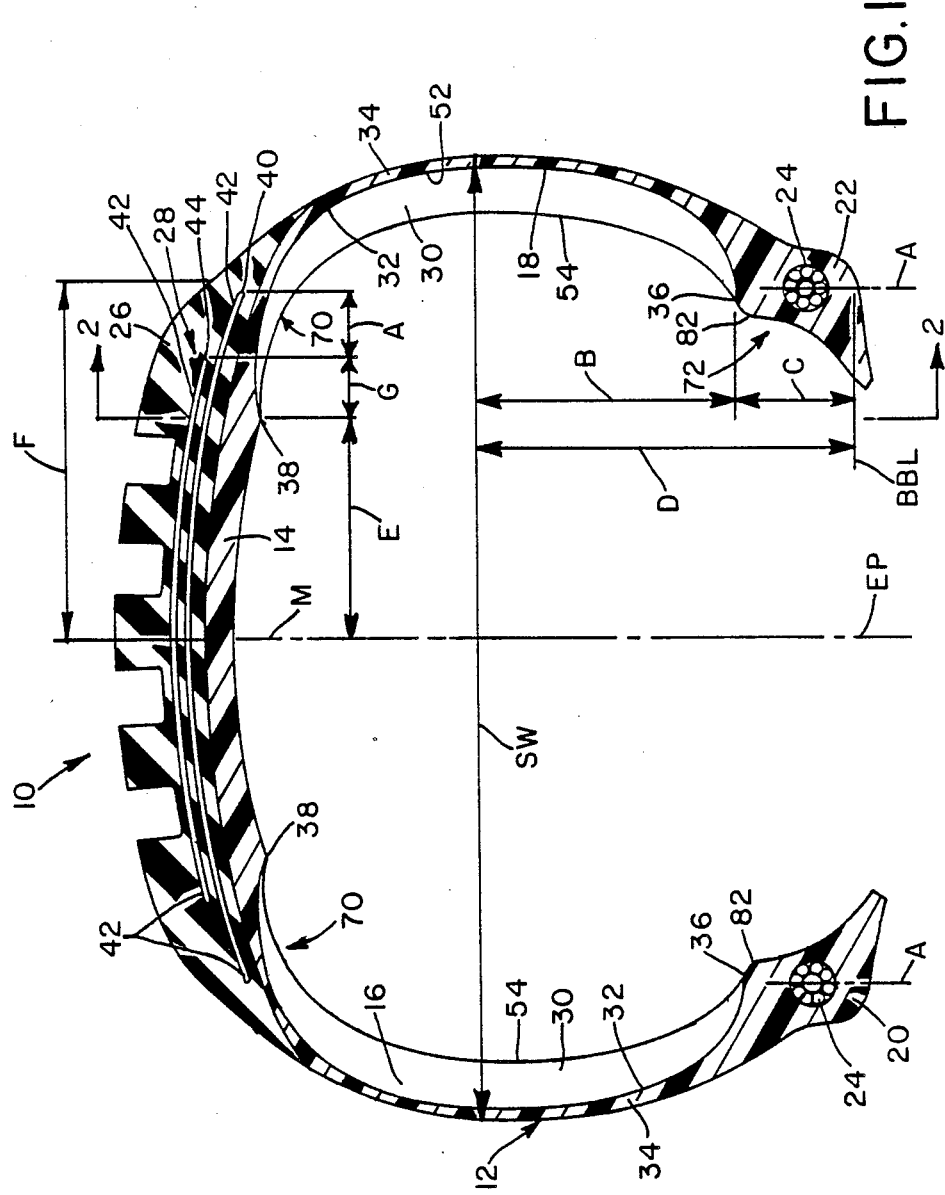
FIG. 1 is a cross-sectional view of a tire according to one aspect of this invention.
Figure 2:
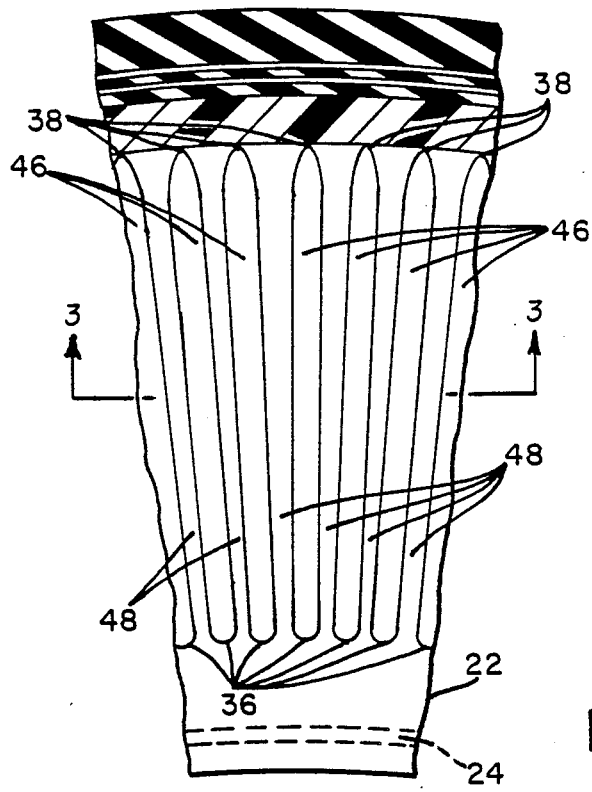
FIG. 2 is a fragmentary side view of a reinforcing means according to the invention taken along the lines 2—2 of FIG. 1.
Figure 3:
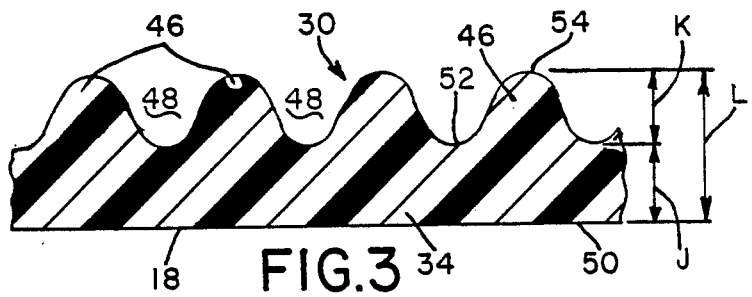
FIG. 3 is an enlarged, fragmentary, cross-sectional view of the tire of FIGS. 1 and 2 taken along lines 3—3.

Referring to FIGS. 1 through 3, a tire shown generally at 10, is provided with a body, shown generally at 12, which includes a circumferentially extending annular portion 14 and a pair of side portions 16 and 18. Each side portion 16,18 extends from each axial edge of the circumferentially extending annular portion 14 to a bead portion 20 and 22. Each bead portion 20, 22 has an annular inextensible bead core or ring 24 therein. The tire is further provided with a surface engaging tread portion 26 and a reinforcing belt structure 28 which extends circumferentially about the body 12 and is radially inwardly of the tread portion 26.

The circumferentially extending annular portion 14 forms an isotropic region, while the side portions 16,18 form two anisotropic regions. The body 12 is comprised of an elastomeric material which is believed to have a Young's modulus E from about 300 to about 300,000 psi depending upon the inflation pressures and the intended purposes for which the tire is to be used. For passenger tires it is preferred to use an elastomeric material having a Young's modulus E from about 1,000 to about 6,000 psi with a more preferred range being from 1,500 to less than 5,000 psi. It is still more preferred to have an elastomeric material that has a Young's modulus E of about 2,000 to about 3,500 psi for passenger tires. Heavy forklift truck tires, for example, may have a Young's modulus E from 3,000 to 5,000 psi while golf carts and garden tractors may have tires in a range from 1,500 to 3,000 psi. Helicopter tires may require an elastomeric material having a Young's modulus E which is greater than 15,000 to about 30,000 psi. One such elastomeric material that can be used for the body comprises polyurethane, which may be thermoplastically reinforced for high Young's moduli. For example, E greater than 20,000 psi may require a mixture of polyurethane and chopped fibers of an aromatic polyamide, for example, known under The Goodyear Tire & Rubber Company trademark Flexten ™. Alternatively it is believed that Boron could be mixed with the polyurethane. One form of polyurethane which is believed to be preferred, especially for passenger tires is polyether.

While the shore A hardness may be between 25 and 95 for either the tread and the body it is preferred that the tread be in the range of 55 to 65 and the body in the range from 80 to 95 for passenger tires.

The reinforcing belt structure 28 prevents or restricts the circumferential growth of the body 12 which may result from inflation and/or the operation of the tire. The tread portion 26 may be comprised of elastomeric material or a rubber material or compound. A rubber tread portion 26 may be more preferred in some instances to increase the traction characteristics of the tire versus those that have been associated with a urethane tread portion.

The tire 10 is provided with a means for decoupling the side portions 16,18 from the annular portion 14. This may be accomplished by providing side portions 16,18 with a reinforcing means 30 along the inner surface 32 of the sidewalls 34. The sidewalls 34 are relatively thin as compared to those that are required for a prior art isotropic cast tire such as disclosed in U.S. Pat. No. 4,305,446. In the preferred embodiment the reinforcing means 30 and the sidewalls 34 produce integral side portions 16,18. This may be accomplished by forming, molding, casting, etc., the reinforcing means and the sidewalls to form the side portions at the same time. In the alternative, the sidewalls may be formed and then at a later time the reinforcing means may be adhered thereto to form a laminate. The reinforcing means may extend circumferentially along the inner surface 32 of each sidewall 34 and may extend from an inner end at point 36 to an outer end 38.

The inner end 36 terminates radially inwardly from the maximum section width SW of the tire but is radially outwardly of the bead core 24. The inner end 36 may terminate at a distance B which is radially inwardly from the maximum section width SW and which is greater than the distance C. The distance C being the distance from the end 36 to the bead baseline BBL, which is a line tangent to the innermost portion of the bead heel sharp point and parallel to the rotational axis of the tire. For the purpose of this invention, the bead heel sharp point is defined by the intersection of the projection of the bead seat taper line in the bead heel area and the projection of the line formed by the lateral face of wheel rim which prevents lateral movement of the tire. The sum of the distance B and C is equal to the distance D, the distance from the maximum section width SW of the tire 10 to the bead base line BBL. Alternatively, the distance D may be stated as being greater than 50 percent of the distance D. It is preferred, however, that the inward end 36 of the reinforcing means 30 be located axially inwardly of a centerline A which is parallel to the equatorial plane EP and which passes through the center of the bead core 24.

The outer end 38 is located along an axial edge of the circumferentially extending portion 14 and located a distance E from the equatorial plane EP of the tire. The end 38 is located equal to or axially inwardly of the axially outermost edge 40 of the belt plies 42. However, it is more preferred that the end 38 be located axially inwardly of the axially innermost edge 44 of the belt plies 42. The distance E may be greater than 50 percent of the distance F, the distance from the tread edge to the equatorial plane of the tire. It is preferred that the end 38 be located axially inwardly of the axially innermost edge 44 of the belt plies 42 a distance G which is equal to the distance H which is the axial distance between the axially most inner edge 44 to the axially outermost edge 40 of the belt plies 42.

The reinforcing means 30, in accordance to one aspect of the invention comprises a series of alternating ridges 46 and grooves 48 which extend substantially perpendicular to the equatorial plane EP of the tire 10 at the maximum section width SW. It is preferred that the reinforcing means be molded to the inside surface of the body during vulcanization of the body. For purposes of this invention the sidewall shall be considered that portion J of the body as measured from the exterior 50 or axially outermost surface of the side portions 18 to the base 52 of the grooves 48; while the reinforcing means shall be considered that portion K as measured from the base 52 of the grooves 48 to the axially outermost portion 54 of the ridges 46. The circumferential spacing between the ridges may be greater at the axial edge of the circumferentially extending portion than radially inwardly from the maximum section height of the tire.

In the preferred embodiment the alternating ridges and grooves are substantially a fellows 20° stub tooth wave form or are substantially sinusoidal in cross-sectional configuration as viewed in a plane perpendicular to the equatorial plane EP and parallel to the axial plane at the maximum section width SW of the tire.

Figure 3A:
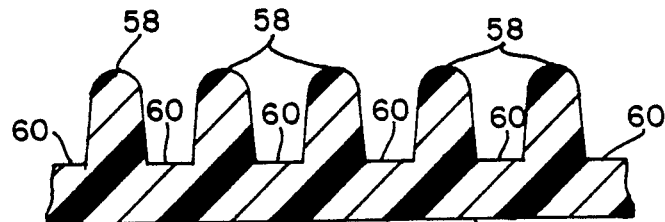
FIG. 3A is a fragmentary, cross-sectional view of an alternate reinforcing means according to the present invention as taken along lines 3—3.
Figure 3B:
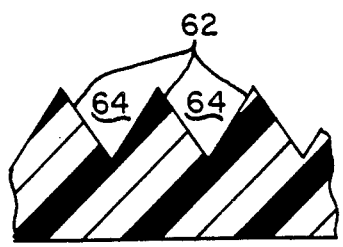
FIG. 3B is a fragmentary, cross-sectional view of an alternate reinforcing means according to the present invention as taken along lines 3—3.
Figure 3C:
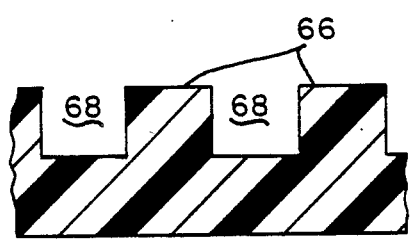
FIG. 3C is a fragmentary, cross-sectional view of an alternate reinforcing means according to the present invention as taken along lines 3—3.

Alternate embodiments of the reinforcing means 30 are shown in FIGS. 3A-3C wherein each is a cross-sectional view taken along lines 3,3 i.e., as viewed in a plane perpendicular to the equatorial plane EP and parallel to the axial plane at the maximum section width SW of the tire. An alternate reinforcing means illustrated in FIG. 3A has rounded ridges 58 with flat grooves 60. In FIG. 3B the alternating ridges 62 and grooves 64 are triangular in cross-section producing a saw-tooth wave form. While FIG. 3C illustrates alternating ridges 66 and grooves that are rectangular in cross-section to produce a rectangular wave and may be modified to produce a square wave.

Referring again to FIGS. 1–3, the reinforcing means has a convex curvature in cross-sectional view. The radially innermost portion of the ridges 54 has a positive curvature from end 36 to end 38, while the base of the grooves 52 also has a positive curvature from end 36 to end 38. The base of the grooves 52 and the radially innermost portion of the ridges 54 intersect at ends 36 and 38 and taper away from one another until they are substantially parallel with one another. This tapering or blending in the region 70, radially inwardly of the tread portion, further provides additional decoupling from the annular portion 14 by allowing this portion of the body to undergo flexure. Thus the region 70 acts like a hinge point between the side portions 16,18 and the annular portions 14. This allows the sidewalls to flex from the annular portion 14 and the tread 26 and belt structure 28. This further reduces the transfer of stresses to and from these regions. This in turn reduces belt edge separation by lowering the tangential shear.

Stress levels produced in the side portions 16,18 remain similar due to the lack of ridges and grooves in the negative curvature 72 portion of the bead portion 22. The ridges 46 provide resistance to the growth of the side portions 16,18; while the groove portions allow for tangential flexibility. This allows the body 12, and the tire 10 as a whole, to be rendered anisotropic by geometric means.

The radial thickness M of the circumferentially extending annular portion must be thick enough to transfer the loading to the belt package while being supple enough so as not to crack due to compression. The sidewalls 32 need to be thick enough to resist the air pressure. The number of ridges and the grooves between them, as well as their length and location in the tire sidewall, can be calculated based on the physics of an attached single leaf spring. For example the stiffness, geometry and the spacing of the ridges is determined by the following equation.

$$\frac{2F}{\beta N} = \frac{EWK^3}{4R^3} \text{ where:}$$

F is the force of load;
$\beta$ is the deflection of the tire;
E is the Young's modulus;
W is the width of the ridges as measured at the base and at the maximum Section Width;
K is the distance as measured from the base of the groove to the axially outermost portion of the ridges at the maximum Section Width;
R is the length of the ridges;
N is the number of the elements.

A typical deflection for passenger tires may be about 17%. Runflat capability comes into effect above this level up to 100%. Using, for example, a 50% deflection for a P155/80R13 tire the corresponding deflection $\beta$ would be 2.54 inches or 64.5 mm.

The reinforcing means works only in compression, therefore only about ⅓ of the tire is being utilized at any one time. The total load has to be carried by this portion of the tire. Therefore, the loaded length of the footprint is ⅓ of the deflected circumference. This will determine the length over which the load F must be supported. Therefore (N) number of element must support this load in the loaded length.

As an example, but not to be limited to, P155/80N13 passenger tires have been manufactured having L, overall side portion thickness of about 10 mm (0.4 inches) at the Section Width;

J, thickness of sidewall, of about 2.54 mm (0.1) inches at the maximum Section Width;

M, radial thickness of the annular portion, of about 4 mm (0.16 inches) at the Equatorial Plane;

3 grooves per 25.4 mm (1 inch) at the maximum Section Width for an

F, the force of the load, of about 400 kg at 200 kpa (882 lbs at 29 psi).

Figure 4:
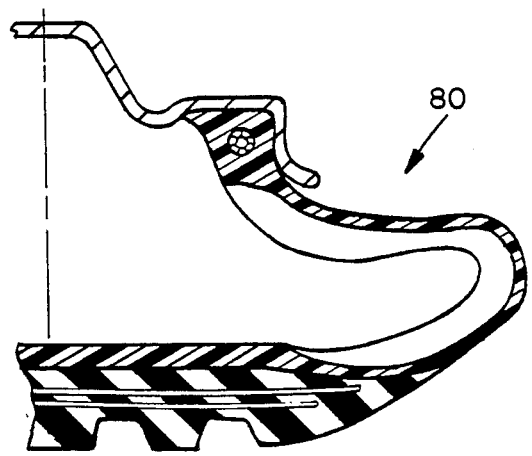
FIG. 4 is a cross-sectional view of a tire according to the present invention in the uninflated state.

A tire made in accordance with the present invention having reinforcing means is advantagous in that the tire exhibits runflat characteristics. Radial tires, by their design have improved runflat characteristics over biased tires. The elastomeric body, such as urethane, will be stiffer than a conventional radial tire at low inflation pressures (0 to 4 psi) as illustrated in FIG. 4. As a result, the tire 80 resists bottoming out and has a higher load capacity. Conversely the tire is not as stiff in a conventional passenger tire at high (22 to 35 psi) inflation pressures.

The bead portion 22 may have a circumferentially extending rib 82 disposed between the bead core 24 and the reinforcing means 30. This provides additional reinforcement to the bead portion and additionally provides an added support structure or shelf upon which the inner end 36 of the reinforcing means 30 may rest.

A tire according to this invention may be manufactured in two or three major manufacturing steps depending upon the circumstances. In either case, a precured package is provided comprising the surface engaging tread disposed over the belt structure. This precured package may be placed into a mold wherein the body is cast onto the precured package. Alternatively, the body may be cast separately in a mold and later attached to the precured package at a later time. The body may be attached to the precured package by an adhesive or by other means. One such method for this approach is illustrated in U.S. Pat. No. 4,669,517, Polyurethane Bonded to Cured Rubber Containing A Diene Polyol which is hereby incorporated as a reference herein.

Figure 5:
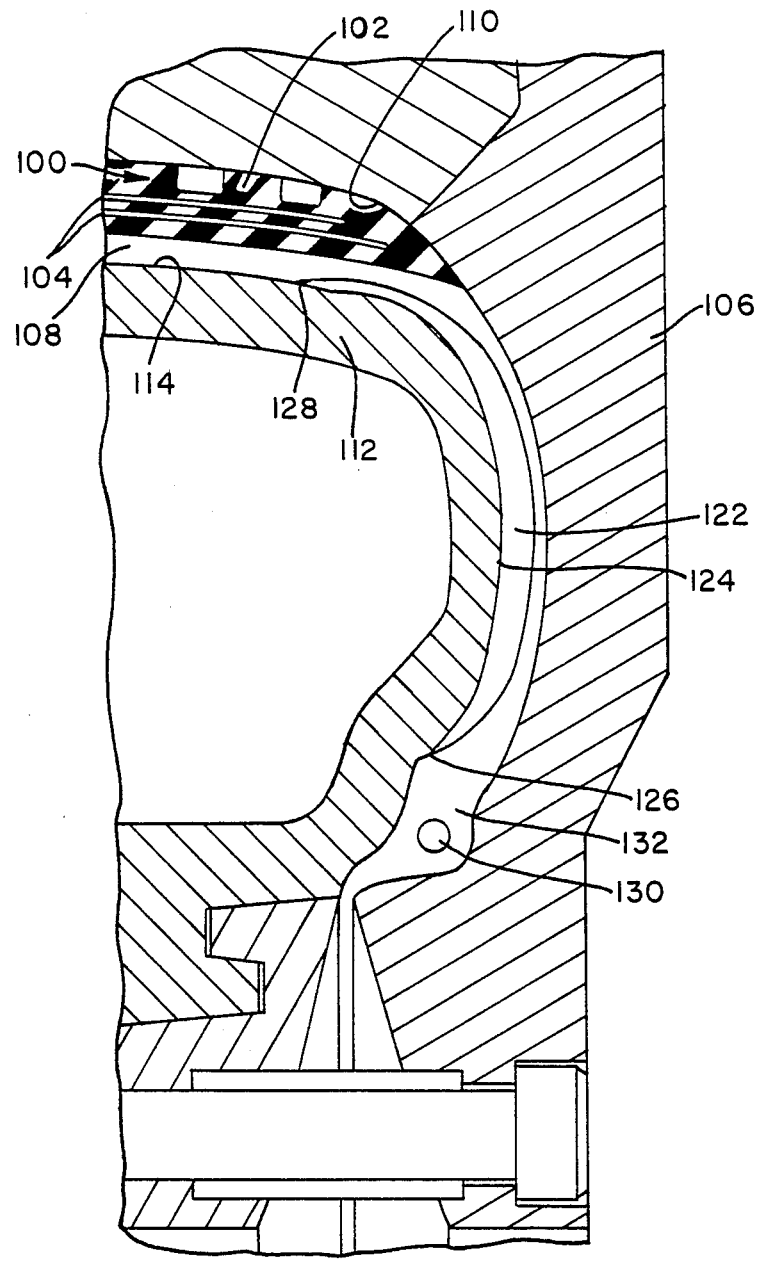
FIG. 5 is a radial cross-sectional view of one side of a plane containing the centerline of an annular mold with a tire in the space between the outer mold member and the core, and parts being broken away.

Utilizing the former approach and referring to FIG. 5 the precured package 100 comprising the surface engaging tread portion 102 and the belt structure 104 is placed in an annular radial tire mold 106 having a mold cavity 108 having an inner molding surface 110. The precured package is placed into the tire mold such that the inner molding surface abuts an outer surface of the surface engaging tread portion 102.

An annular rigid core 112 is provided inside the mold 106 which has an outer molding surface 114 spaced from the inner molding surface 110. The outer molding surface 114 is provided with a general positive radius of curvature for forming the inner surface of the tire.

A number of alternating ridges 122 and grooves 124 are provided on the outer surface 114 of said core 112 for forming areas of alternating thickness in each side portion of the tire, the ridges 122 and grooves 124 may extend from a point 126 radially inwardly from the maximum section width SW of the tire to a point 128 spaced a predetermined distance from the equatorial plane EP of the tire. An inextensible bead core 130 is placed in the bead portion 132. The tire is cast by filling the space between the outer and inner molding surfaces and the precured package with an elastomeric precursor and setting the precursor to form. After the elastomeric precursor has been formed the resulting tire is removed from the mold cavity.

Utilizing the alternative approach the body would be cast in a similar method with the exception that the mold would be modified such as not to include the precured tread/belt package. The body and the precured package could later be bonded together in another step at a later time.

While certain representative embodiments and details have been shown for the purpose of illustrating the invention, it will be apparent to those skilled in this art that various changes and modifications may be made therein without departing from the scope of the invention.

It is claimed:

1. A tire comprising:
   an elastomeric cordless body having a circumferentially extending annular isotropic portion, a pair of anisotropic side portions, each extending radially inwardly from an axial edge of said annular isotropic portion to an isotropic bead portion, an inextensible bead ring disposed within each bead portion;
   a surface engaging tread portion disposed radially outwardly of said body; and
   a belt structure disposed between said body and said tread portion.

2. The tire of claim 1 wherein said anisotropic side portions comprise a means for decoupling the side portions from the annular portion.

3. The tire of claim 1 wherein said anisotropic side portions each further comprise a sidewall and a reinforcing means located along an inner surface of said sidewall comprising a series of alternating ridges and grooves.

4. The tire of claim 3 wherein said reinforcing means has a convex curvature as in cross-sectional view from a plane perpendicular to the equatorial plane and passing through the axis of rotation.

5. The tire of claim 4 wherein the grooves and the radially innermost portion of the ridges intersect one another at a point located radially inwardly of the tread portion and adjacent to the annular isotropic portion, and axially outwardly therefrom said grooves and ridges taper away from one another until reaching a predetermined separation and tapering together at another point located radially inwardly of the maximum section height.

6. The tire of claim 5 wherein the ridges and grooves are determined by $$\frac{2F}{\beta N} = \frac{EWK^3}{4R^3} \text{ where:}$$

F is the force of load;

β is the deflection of the tire;
E is the Young's modulus;
W is the width of the ridges as measured at the base and at the maximum Section Width;
K is the distance as measured from the base of the groove to the axially outermost portion of the ridges at the maximum Section Width;
R is the length of the ridges;
N is the number of the elements.

7. The tire of claim 6 wherein said body comprises polyurethane and said tread portion comprises rubber.

8. The tire of claim 7 wherein the body has a Young's modulus E from about 300 to less than 5,000 psi.

9. The tire of claim 8 wherein the body has a Young's modulus E of about 2,000 to about 3,500 psi.

10. The tire of claim 7 wherein the body has a Young's modulus E of greater than 15,000 psi and less than 3,000,000 psi.

11. The tire of claim 9 wherein said alternating ridges and grooves are substantially sinusoidal in cross-sectional configuration as viewed in a plane parallel to the axial plane at the maximum section width of the tire.

12. The tire of claim 9 wherein said alternating ridges and grooves are a 20° stub tooth wave form as viewed in cross-sectional configuration in a plane parallel to the axial plane at the maximum section width of the tire.

13. A tire comprising:
a cordless elastomeric body; a surface engaging tread portion disposed radially outwardly of said body; a belt structure disposed between said body and said tread portion; said body having a circumferentially extending portion and a pair of sidewalls, each sidewall extending from said circumferentially extending portion to a bead portion having an inextensible bead ring therein and a reinforcing means attached to an inner surface of each said sidewall, said reinforcing means comprising a series of alternating ridges and grooves, and extending circumferentially along the inner surface of each sidewall and from a point radially inwardly from the maximum section width of the tire to an axial edge of the circumferentially extending portion, said axial edge being spaced a predetermined distance from the equatorial plane of the tire and equal to or axially inwardly thereof an axially outermost edge of the axially outermost belt ply of the belt structure.

14. The tire of claim 13 wherein said reinforcing means has a convex curvature as in cross-sectional view from a plane perpendicular to the equatorial plane and passing through the axis of rotation.

15. The tire of claim 14 wherein said alternating ridges and grooves are substantially sinusoidal in cross-sectional configuration as viewed in a plane perpendicular to the Equatorial Plane and parallel to the axial plane at the maximum section width of the tire.

16. The tire of claim 14 wherein said alternating ridges and grooves are a rectangular wave in cross-sectional configuration as viewed in a plane perpendicular to the Equatorial Plane and parallel to the axial plane at the maximum section width of the tire.

17. The tire of claim 14 wherein said alternating ridges and grooves are a triangular wave in cross-sectional configuration as viewed in a plane perpendicular to the Equatorial Plane and parallel to the axial plane at the maximum section width of the tire.

18. The tire of claim 14 wherein said ridges are rounded and the grooves are flat.

19. The tire of claim 14 wherein said alternating ridges and grooves are a 20° stub tooth wave form as viewed in cross-sectional configuration in a plane parallel to the axial plane at the maximum section width of the tire.

20. The tire of claim 14 wherein the ridges and grooves are determined by $$\frac{2F}{\beta N} = \frac{EWK^3}{4R^3} \text{ where:}$$

F is the force of load;
β is the deflection of the tire;
E is the Young's modulus;
W is the width of the ridges as measured at the base and at the maximum Section Width;
K is the distance as measured from the base of the groove to the axially outermost portion of the ridges at the maximum Section Width;
R is the length of the ridges;
N is the number of the elements.

21. The tire of claim 20 wherein each bead portion further comprises a circumferentially extending rib disposed between said bead ring and the reinforcing means.

22. The tire of claim 20 wherein the body comprises polyether.

* * * * *